(12) United States Patent
Hundscheidt et al.

(10) Patent No.: US 7,734,762 B2
(45) Date of Patent: Jun. 8, 2010

(54) REPORTING FOR MULTI-USER SERVICES IN WIRELESS NETWORKS

(75) Inventors: Frank Hundscheidt, Kerkrade (DE); Thorsten Lohmar, Aachen (DE); Michael Meyer, Aachen (DE); Stefan Wager, Esbo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1224 days.

(21) Appl. No.: 10/533,228

(22) PCT Filed: Oct. 17, 2003

(86) PCT No.: PCT/EP03/11506

§ 371 (c)(1), (2), (4) Date: Apr. 28, 2005

(87) PCT Pub. No.: WO2004/040928

PCT Pub. Date: May 13, 2004

(65) Prior Publication Data

US 2006/0069799 A1 Mar. 30, 2006

(30) Foreign Application Priority Data

Oct. 29, 2002 (EP) ................................ 02024084

(51) Int. Cl.
*G06F 15/173* (2006.01)
(52) U.S. Cl. ...................................................... 709/224
(58) Field of Classification Search ......... 709/221–226, 709/231, 234, 200, 203, 204, 246, 217, 232, 709/250; 370/401, 229, 312, 390, 466, 410, 370/524, 399, 280, 231; 455/456, 433, 422; 713/154
See application file for complete search history.

(56) References Cited

U.S. PATENT DOCUMENTS

| | | | | |
|---|---|---|---|---|
| 5,768,527 A * | 6/1998 | Zhu et al. | ..... | 709/231 |
| 5,928,331 A * | 7/1999 | Bushmitch | ..... | 709/231 |
| 6,633,765 B1 * | 10/2003 | Maggenti | ..... | 455/503 |
| 6,757,543 B2 * | 6/2004 | Moran et al. | ..... | 455/456.1 |
| 6,781,999 B2 * | 8/2004 | Eyuboglu et al. | ..... | 370/399 |
| 2002/0075824 A1 | 6/2002 | Mei et al. | | |
| 2003/0061368 A1 * | 3/2003 | Chaddha | ..... | 709/231 |
| 2004/0102195 A1 * | 5/2004 | Naghian et al. | ..... | 455/456.1 |
| 2005/0188101 A1 * | 8/2005 | Ludwig et al. | ..... | 709/238 |

FOREIGN PATENT DOCUMENTS

| | | |
|---|---|---|
| EP | 1 063 819 A | 12/2000 |
| WO | WO 99 53703 A | 10/1999 |
| WO | WO 02 51181 A | 6/2002 |
| WO | WO 02/082415 | * 10/2002 |

* cited by examiner

*Primary Examiner*—Nathan Flynn
*Assistant Examiner*—Mark O Afolabi

(57) ABSTRACT

A method and system for adapting multi-user multimedia data in a communication system with a server providing the multi-user multimedia data to clients and with an intermediate network part. The intermediate network part is arranged to provide information on communication between the server and the clients. The server sends multimedia data to the clients. Distribution characteristics are determined for the clients, which are considered by the generation of an aggregated feedback report on the clients' reception conditions of the multimedia data in the intermediate network part. The feedback report includes additional information about aggregation fashion. The aggregated feedback report is sent to the server in order for the server to adapt the transmission of the multimedia data from the server to the clients according to the aggregated feedback report.

22 Claims, 5 Drawing Sheets

FIG. 3

REPORTING FOR MULTI-USER SERVICES IN WIRELESS NETWORKS

TECHNICAL FIELD OF THE INVENTION

BACKGROUND OF THE INVENTION

1. Field of the Invention

The present invention relates generally to communications networks and in particular, to a method for adapting multi-user multimedia data in a communication system.

2. Description of Related Art Including Information Disclosed Under 37 CFR 1.97 and 1.98

Universal Mobile Telecommunication System UMTS is being developed to offer wireless wideband multimedia service using Internet protocol. The UMTS as a third-generation 3G mobile communication combines streaming with a range of unique services, like for example geographical positioning, to provide high-quality Internet content to the users. Images, voice, audio and video content are example of mobile multimedia services, which are delivered to the users via media streaming and download techniques. It means once the content has been put onto a media server, it can be delivered on-demand via download or streaming. To download content, the user clicks on a link and waits for the content to be downloaded and playback to begin. Download capabilities are easy to integrate since the hypertext transfer protocol (HTTP) can be used for downloading files. To access streaming data or general speaking multimedia data, the user clicks on a link to start playback, which is almost immediate. Because streaming is a semi-real time service that receives and plays back data at the same time, it puts greater demands on protocols and service implementation, especially when the service is to work over networks with little or no quality of service, like this is the case in UMTS. The radio resources, which are used on the last part of a transmission is to be used in a better way.

Currently work is being done to introduce broadcasting and multicasting into WCDMA and GSM wireless networks. Both broadcast and multicast provide transport efficiency and reduce the load on the content servers, like for example the streaming servers. Additionally solutions are being worked out for performing streaming or general formulated multimedia transmission in a wireless network. In the following the corresponding architectures are presented.

Figure 1:
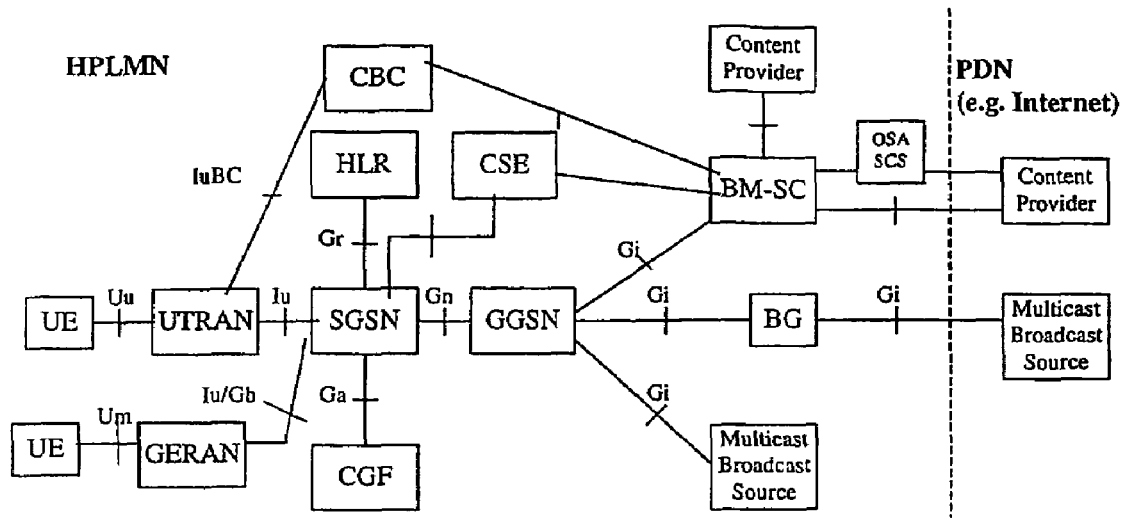

The FIG. 1 shows the current so-called Multimedia Broadcast/Multicast Service (MBMS) architecture. In the following merely the most important nodes and examples of the different access networks, like UTRAN, GERAN, connecting the end user UE are mentioned. The access networks are handled by means of a serving node, SGSN that communicates with an edge node, the GGSN that is responsible for connection to the external networks, like Internet. The BM-SC entity connected to GGSN is responsible for the provision of multicast/broadcast, like for example for bearer establishment and data forwarding. BM-SC offers interfaces to a content provider, so that said content provider can request data delivery to the users. The BM-SC may authorise and charge content providers.

In order to keep the solution simply, it is foreseen currently on the radio network part to support only a downlink channel for data traffic going to the end user UE. It means there is no uplink channel in an access network, which can be used by the end users UE to send for example reports regarding the quality of receiving.

Figure 2:
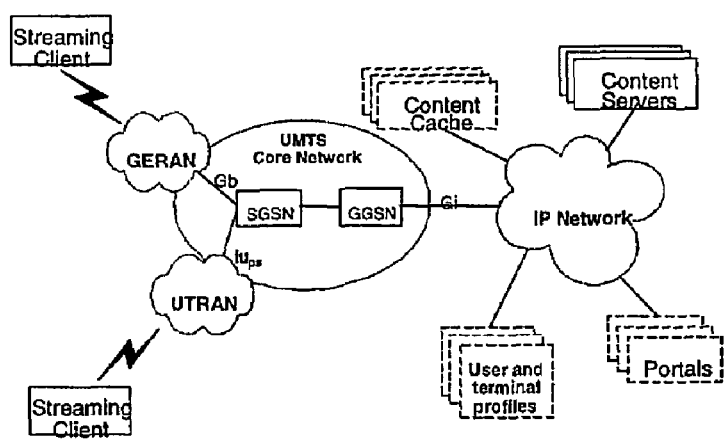

The transmission of the multimedia flow for a single user is performed in a wireless network by means of a Packet Switched Streaming architecture. Said architecture is depicted in FIG. 2. It shows streaming client being connected via an access network, like UTRAN or GERAN with an UMTS Core network. In the UMTS two important kind of nodes are depicted, SGSN and GGSN. The SGSN is a serving node for handling the to the access networks attached users. The GGSN is responsible for connection to the external networks, like IP Network. For the purpose of multimedia provision there are different entities in the IP network, like content server being responsible for providing multimedia data.

Figure 3:
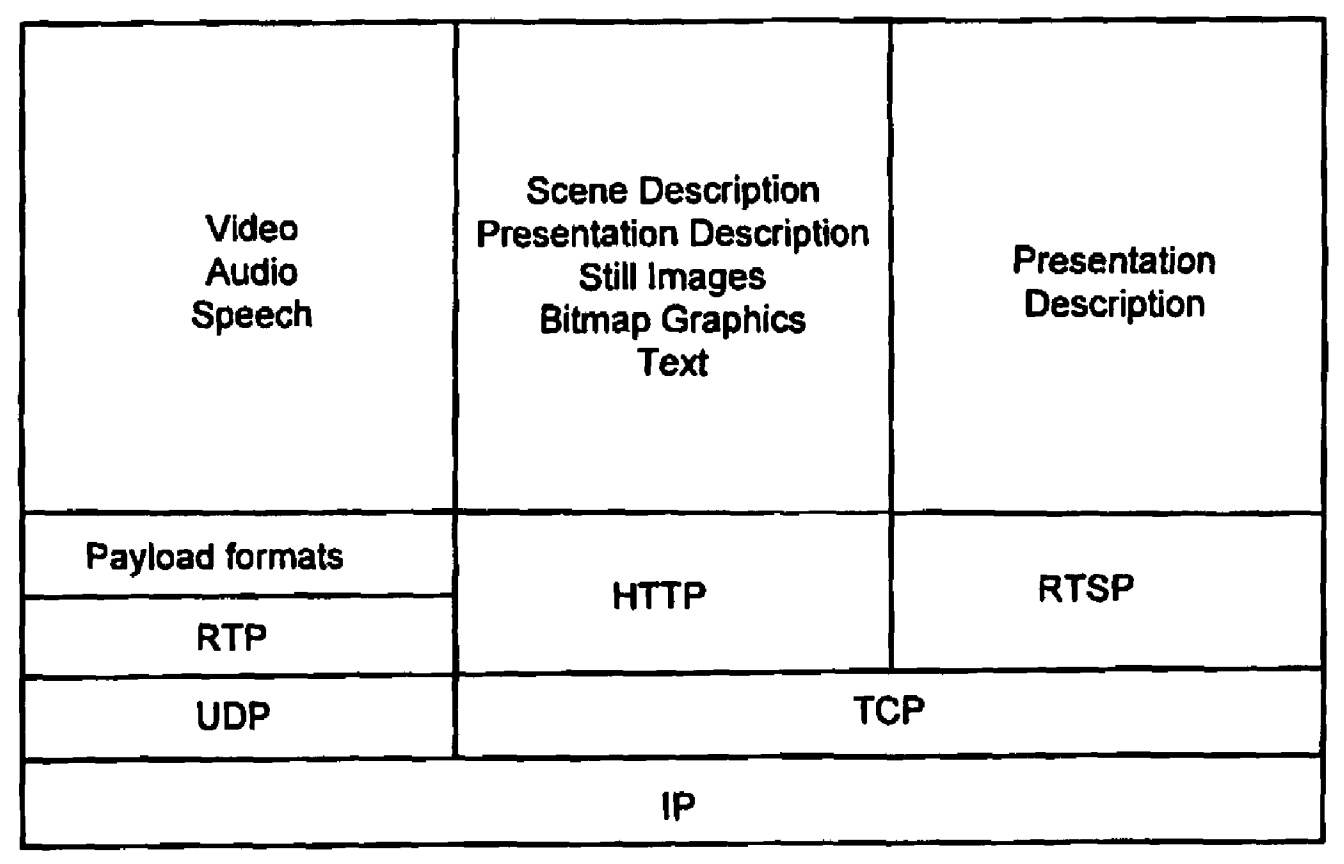

The multimedia data is distributed by means of multimedia protocols. The FIG. 3 shows a protocol stack with the protocol layers responsible for multimedia transmission, Real-time Transport Protocol RTP. The RTP uses Universal Datagram Protocol UDP as a transport protocol appropriate for transmission of streaming data, because UDP provides a fast transmission although not reliable like it is the case by Transmission Control Protocol TCP. HTTP and Real-Time Streaming Protocol RTSP run over the reliable TCP. The RTSP provides session control for streaming sessions. HTTP is used for transmission of still images, bitmap graphics and text.

The RTP provides end-to-end network transport functions suitable for applications transmitting real-time data, such as audio, video or simulation data, over multicast or unicast network services. The functions provided by RTP include payload type identification, sequence numbering, timestamping, and delivery monitoring. The RTP contains a related RTP Control Protocol RTCP augmenting the data transport, which is used to monitor the QoS and to convey information about the participants in an ongoing session. Each media stream in a conference is transmitted as a separate RTP session with a separate RTCP stream.

RTP adds a time stamp and a sequence number to each UDP packet in a special RTP header. The time stamp is related to the sampling or the presentation or composition time of the media carried in the payload of the RTP packet. It is used for playing back media at the correct speed, and together with RTCP, it is used for synchronizing the presentation of other streaming media. A payload specification defines the interpretation of the time stamp and other RTP fields. The recipient uses the sequence number to detect the loss of packets statistics on loss can be reported to the server by means of RTCP.

RTCP reports provide statistics about the data received from a particular source, such as the number of packets lost since the previous report, the cumulative number of packets lost, the interarrival jitter, etc. An additional draft defines a format for extensions to the RTCP sender and receiver reports. A detailed description of RTCP can be found in RFC 1889, Chapter 6. The RTCP control protocol is based on the periodic transmission of control packets to all participants in the session, using the same distribution mechanism as the data packets. The underlying protocol must provide multiplexing of the data and control packets, for example using separate port numbers with UDP.

The primary function of RTCP is to provide feedback on the quality of the data distribution. This is an integral part of the RTP's role as a transport protocol and is related to the flow and congestion control functions of other transport protocols. The feedback may be directly useful to diagnose faults in the distribution. Sending reception feedback reports to all participants allows one who is observing problems to evaluate whether those problems are local or global. With a distribution mechanism like IP multicast, it is also possible for an entity such as a network service provider who is not involved in the session to receive the feedback information and act as a third-party monitor to diagnose network problems. This feedback function is performed by the RTCP sender and receiver reports. The RTCP specification requires that all participants send RTCP packets, therefore the rate must be controlled in order for RTP to scale up to a large number of participants. By having each participant sending its control packets to all the others, each can independently observe the number of participants. This number is used to calculate the rate at which the packets are sent.

Furthermore the RTCP has an optional function to convey minimal session control information, for example participant identification to be displayed in the user interface. This is most likely to be useful in sessions where participants enter and leave without membership control or parameter negotiation. RTCP serves as a convenient channel to reach all the participants, but it is not necessarily expected to support all the control communication requirements of an application. A higher-level session control protocol, which is beyond the scope of this document, may be needed.

The above described functions, besides the last one being optional, are mandatory when RTP is used in the IP multicast environment and are recommended for all environments.

Therefore the multimedia service in wireless network is to be used as well for a single user, the so-called unicast connections but all above for a group of users, the so-called point-to-multipoint or even multipoint-to-multipoint connections. The point-to-multipoint services require high demands on the network infrastructure and consume considerable amounts of bandwidth. Some examples of such services are video-conferencing, whiteboarding, real-time multi-user games, multimedia messaging, virtual worlds. This kind of multimedia applications uses for transport broadcast or multicast mode. Broadcast has the possibility of addressing a packet to all destinations by using a special code in the address field. When a packet with this code is transmitted, it is received and processed by every user on the network. This mode of operation is called broadcasting. Multicasting supports transmission to a subset of the users. Each can register to a multicast group. When a packet is sent to a certain group, it is delivered to all users registered to that group.

The RTCP has mechanisms for reporting in case of multicast sessions. However, in case of radio networks the multicast reporting waste air interface resources and potentially overloads the network servers. Furthermore, in the preferred multicast solution there is only a downlink and no uplink channel. This implies that the users cannot send RTCP reports to the source.

In RFC 1889 there is an entity, the so-called mixer introduced. The mixer receives RTP packets from one or more sources, possibly changes the data format, combines the packets in some manner and then forwards a new RTP packet. Since the timing among multiple input sources will not generally be synchronized, the mixer will make timing adjustments among the streams and generate its own timing for the combined stream. Thus, all data packets originating from a mixer will be identified as having the mixer as their synchronization source. Therefore the mixer creates a new message being a combination of the received messages.

However, for the current RTP the use of RTCP receiver reports is mandatory in multicast sessions. In particular it is important that the multicast sender receives these reports to signal that clients are still listing. The current revision of the RTP provides a feature to suppress RTCP receiver report usage. However, by omitting RTCP receiver reports also an important means of getting quality feedback from the receivers is omitted. The source cannot adapt to changing conditions and also cannot provide alternative streams.

It is anyhow questionable what the source should do if an RTCP report from a single client indicates that several RTP frames were corrupted or lost and that client would better be served with a lower data rate. This is especially a big question mark in wireless networks with increasingly heterogeneous users. The multimedia users are characterized by a variety of mobile terminals with a wide range of display sizes and capabilities. In current multicast solutions the source will either ignore such reports or adapt to the slowest receiver. Both are not adequate when clients are charged for the service and the bearer that is used for the service. In addition different radio-access networks make multiple maximum-access link speeds available. Because of the physical characteristics of cellular radio networks, the quality and, thus, the data rate of ongoing connection will also vary, contributing to the heterogeneity problem.

Therefore the following problems occur regarding the RTCP reporting in multicast sessions in wireless networks. The scarce radio resources are used inefficient, when every user sends a RTCP report. This can also leads to overload of servers, like RNC, SGSN, GGSN, for example in case the reports are generated by a high number of users, for example in a football arena. Because of the heterogeneous networks the source must adapt to slowest user. Further because of the higher number of reports and the long time needed for evaluation of the reports a long delay is generated before the source is aware of a problem. Further the RTCP reports do not contain all necessary information for wireless networks

SUMMARY AND DESCRIPTION OF THE INVENTION

It is an object of the present invention to provide a solution for an efficient utilization of a radio interface for multi-user multimedia services in wireless network.

The basic idea is to adapt multi-user multimedia data in a communication system with a server providing the multi-user multimedia data to clients and with an intermediate network part. Said intermediate network part is arranged to provide information on communication between the server and the clients. The server sends multimedia data to the clients. For the clients distribution characteristics are determined, which are considered by generation of aggregated feedback report on the clients' reception conditions of the multimedia data in the intermediate network part. Said feedback report includes additional information about aggregation fashion. Said aggregated feedback report is sent to the server in order the server adapts the transmission of the multimedia data from the server to the clients according to the aggregated feedback report.

An advantage of the invention is the provision of efficient utilisation of scarce and expensive network resources in wireless networks, in particular on the uplink direction. With the present invention is achieved that the radio resources are utilised in a better way because the report are relevant for more then one user. In case of one user the source needs to perform a lot of reporting analyses in case of large user sessions. This is especially a waste of resources if the members can be grouped into one or a few access networks with very similar characteristics and behavior. Furthermore this will reduce the load and the complexity in the source. This solution provides the only way of reporting in case no uplink channel is available, as in the broadcast solution. Besides the aggregated RTCP report can consider all information in the cell, rather than a single dedicated RTCP report per client. For example in case of almost overload situations, the RNC knows this before congestion is encountered by loosing frames and can report this to the source for all clients in the same cell. This would improve the quality experience for the end-user. Furthermore in general the reporting is faster since the air-interface delay is skipped. This is very much the same as for the single-user multimedia case.

In one embodiment of the present invention the distribution characteristics are related to a geographical area including a group of clients. One or more cells as defined in a wireless communication network can build the geographical area.

In another embodiment the distribution characteristics are related to a determined multicast group structure, which can include clients having devices for receiving data transmitted with high or with low speed.

In a preferred embodiment the distribution characteristics are related to information received from a radio resource management. The radio resource management has the actual information about the current transmission performance on the radio interface. Therefore it is preferable to consider this information in the generation of the feedback report.

The interaction between the intermediate node and the radio resource management can be performed either frequently or event-based.

In another embodiment the distribution characteristics are related to information received from the clients. In order to improve the quality of the aggregated feedback report the clients sends their own reports. The advantage of this solution is that the aggregated feedback reports include information that can not be determined from the distribution characteristics being derived form the radio layers.

It is proposed that the information received from the clients is sent either frequently or event-based, when for example an extraordinary event occurs.

It is preferable that feedback reports from the clients are suppressed in the client terminals. The advantage of this embodiment is that no traffic is produced on the uplink link so that radio resources are saved. In particular in case no uplink channel is available this is a preferable solution.

Further it is advantageous to receive information from the radio resource management, which has the actual information about the current radio resource availability and from the clients and to combine the information in order to generate a more adequate feedback report to the server.

In a preferred embodiment of the present invention the additional information about aggregation fashion includes a number of clients to whom the aggregated feedback report applies so that the server can distinguish when a report applies to one client or to a group of clients. According to this information one can decide on a proper action for example whether an adaptation is useful or whether a replication of the actual stream is more suitable.

In another preferred embodiment of the present invention the additional information about aggregation fashion comprises radio characteristics of an access network in which the clients are. Having this information the server can distinguish how to adapt the multimedia flow considering the specific characteristics of different access networks.

It is proposed that the aggregated feedback report includes also information for the server about the adaptation manner. Thus, the server receives additional information for better judgment how the stream could/should be adapted.

It is preferably that a negotiation on the frequency of feedback reports from the clients and/or from the radio resource management to the intermediate node is performed. This can be either in fixed intervals or event-based, it means when a certain circumstances occur.

In an advantageous embodiment the clients refrain from sending feedback reports to other clients receiving the data stream so that the anonymity of the multimedia clients to whom the multimedia data is to be multicast is guaranteed.

In a preferred embodiment of the present invention the generated aggregated feedback report includes a fraction of lost packets provided by the intermediate node depending on the current conditions of delivery. This fraction can be for example a highest sequence number the intermediate node has received or an interarrival jitter provided by the intermediate node.

It is proposed that the server receiving the aggregated feedback report acts in a proper manner. For example the server adapts accordingly after the information included in the report considering the percentage of the clients for which said feedback applies is utilized. The reaction can be to announce a new channel to the clients or to adapt the stream, for example to reduce bit-rate or to switch to more reliable codec.

Further it is proposed to implement the functionality of the intermediate network part in the same network part. In the alternative solution it is proposed to split the functionality between different nodes forming the intermediate network part.

An embodiment of the present invention is based on the Real-time Transport Protocol RTP having a control protocol Real-time Transport Control Protocol RTCP for reporting feedback. However the present invention should not be restricted to this example of multimedia protocols.

Furthermore the present invention discloses an intermediate network part adapted to perform an adaptation of multi-user multimedia data in a communication system with a server providing the multi-user multimedia data to clients. The intermediate network part is arranged to provide information on communication between the server and the clients. It includes means for forwarding multimedia data from the server to the clients. Means for determination of distribution characteristics associated with the clients is also part of the intermediate network part. The task of said means is to determine for example from the radio resource management having access to the lower layers the transmission conditions, on which the multimedia is transmitted to the clients.

Further the intermediate network part node has means for generating an aggregated feedback report on the clients' reception conditions of the multimedia data considering distribution characteristics, wherein said feedback reports include additional information about the aggregation fashion. In this manner generated feedback report is sent to the server by means for sending the aggregated feedback report.

It is proposed that the means of the intermediate network part are implemented in the same network node. Alternatively it is proposed that the means for determining of distribution characteristics associated with the clients and the means for generating an aggregated feedback report are split between different nodes. In the last case it is required to provide means for receiving the external determined distribution characteristics associated with the clients.

In the following a detailed description of the invention is given.

FIG. 1: Broadcast/Multicast Service (MBMS) architecture.

FIG. 2: Packet Switched Streaming (PSS) architecture.

FIG. 3: Protocol stack with the protocols layers for streaming transmission.

Figure 4:
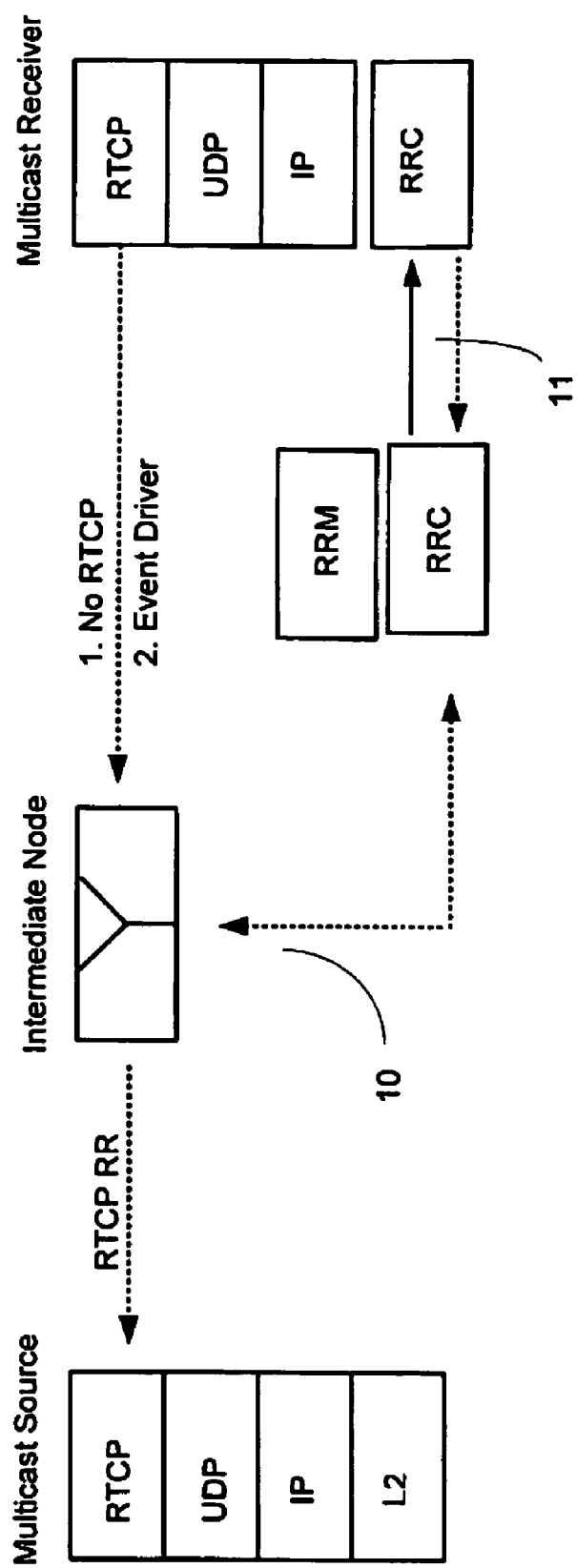

FIG. 4: Protocol model for the present invention.

Figure 5:
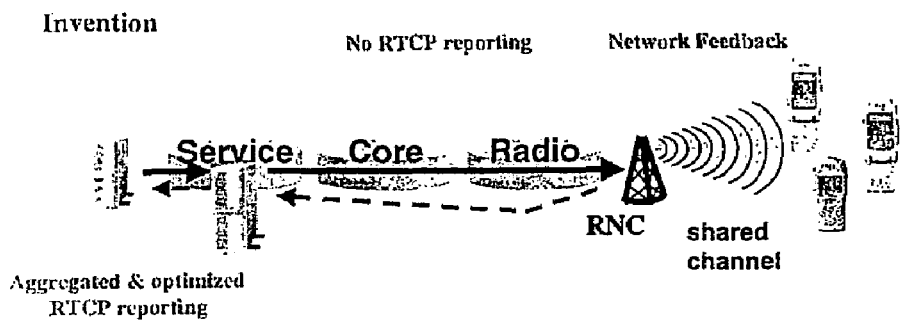

FIG. 5: Embodiment of the present invention for determining of distribution characteristics associated with the clients.

Figure 6:
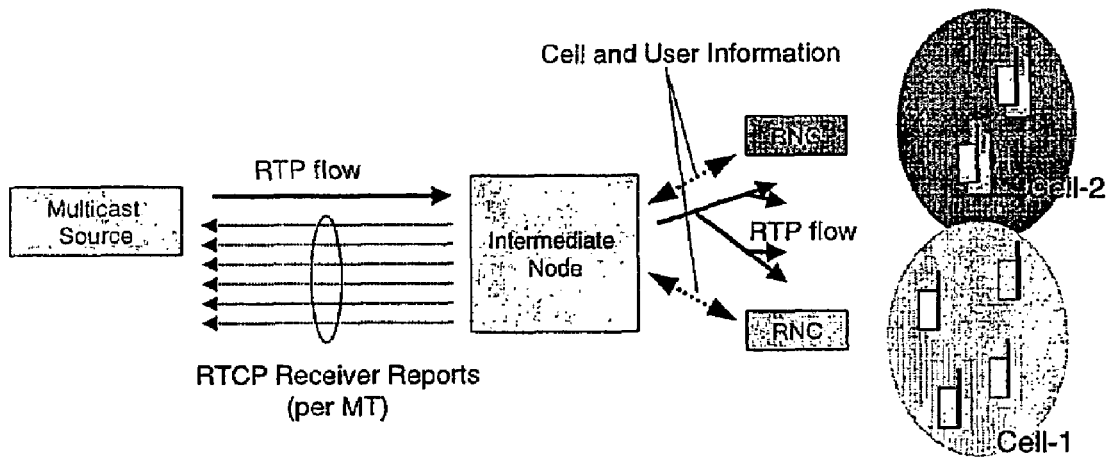

FIG. 6: Embodiment of the present invention for generation of an aggregated feedback report per mobile terminal.

Figure 7:
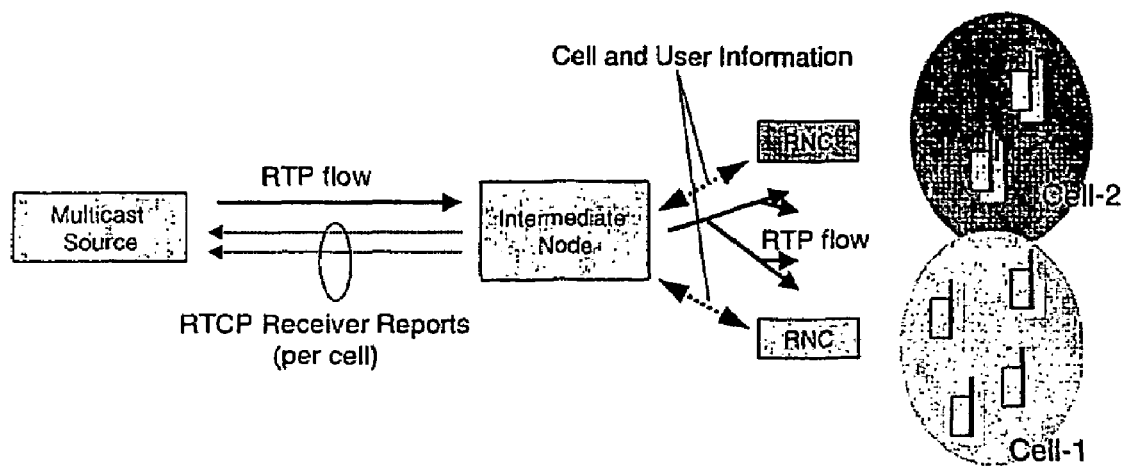

FIG. 7: Embodiment of the present invention for generation of an aggregated feedback report per cell.

In the following the present invention is explained in respect to a wireless network using the RTP. The terms intermediate node and intermediate network part are used as synonyms.

The basic idea is to have an intermediate network part in the wireless network taking care of an aggregated RTCP reporting, rather than that each user individual performs its own reports. The term intermediate network part describes a functionality, which can be implemented in one node, in the following described as intermediate node or the functionality can be split between different network nodes.

The aggregated RTCP reporting or general one feedback report for example per multicast group is generated. A real time determination of distribution characteristics is performed considering cell related characteristics determination and the group structure. The generation of the feedback report is based on the real time determination of distribution characteristics wherein said feedback report includes additional information including for example the number of users to which said feedback report applies. Said feedback report is sent to the server being the multicast source, which utilizes the group feedback report by considering the percentage of the users for which said feedback report applies. The multicast/broadcast transmission is adapted accordingly to the utilized feedback report. Furthermore optionally the intermediate node makes proposal to the multicast source on how to adapt the stream for the corresponding group of users, for example only multiple unicast is proposed if that's possible or handover overlay cell or other access network can be proposed. The reason for this is that the RNC, which can provide the intermediate node with certain data, may have information, like for example radio characteristics of the cell area, that the source does not have and it may thus be in a better situation to judge how the stream could/should be adapted. As an example, RTCP currently indicates that the reception quality is not good, which triggers a source to go down with the bitrate to the next lower level. An RNC that determines an almost overloaded cell and many session initiations per time unit could indicate that the bitrate has to be decreased.

By receiving the aggregated feedback report the source utilizes the information included in the report considering the percentage of clients for which the feedback applies. The reaction can be to announce a new channel to the clients or to adapt the stream, for example to reduce bit-rate or to switch to more reliable codec.

To refrain the clients from sending RTCP Receiver Reports and generate RTCP receiver reports in an intermediate node, which hides the receivers of an entire cell. The intermediate node gets information from the RNC and creates a RTCP report from this. Additionally, RTCP packets with special wireless information can be used and filtered out at the RTCP generation node, which is the intermediate node.

Furthermore, optionally the RTCP report could contain in addition to the number of users the actual end-user addresses, since this may be of interest to the other users and/or the source.

In the following a description with respect to FIG. 4 is given.

FIG. 4 presents a protocol model for the present invention. It shows a multicast source, which sends the multimedia data to the clients by means of RTP Sender messages, not depicted in the figure. The protocol stack in the multicast source includes the RTP with the corresponding RTCP layer located above UDP and IP protocols. The L2 is a general description for a link layer, which differs dependent on the network to which the data is sent. A corresponding protocol stack is shown on the receiver side, multicast receiver. However the link layer is specified for the wireless network in this case it is the Radio Link Protocol with the Radio Resource Control (RRC) protocol. According to the invention there is an intermediate network part located between the multicast source and the multicast receiver, intermediate node. In the FIG. 4 the different options for generation an aggregated feedback report are presented.

It is possible that the intermediate node does not receive any information from the clients. It means no RTCP reporting over the air interface is available. The generation of RTCP feedback report is performed from scratch in the intermediate node on the basis of the received RTP stream and potentially on Radio Resource Management RRM knowledge about a certain cell or area. For the purpose of receiving the RRM information the communication link, 10 is used. This information can be either sent frequently or on the event-based basis. A report from the clients is not sent due to the fact that the client refrains from sending RTCP reports on RTP/RTCP level or because all RTCP reports are blocked in the client's terminal.

In certain situations the client is allowed to send RTCP reports on unicast uplink channels, event-driven Reporting on the communication link between multicast receiver and the intermediate node. It means even in cases when the report are refrained or blocked in the client's terminal there is an option to send only RTCP reports with special information, it means no regular RTCP reports are sent. Only in case of extraordinary events, the RTCP reporting is done. In the case when report is refrained in the client's terminal this is handled on RTCP level. In case of blocked reports in the client, the terminal would have to filter the regular RTCP reports. Which RTCP reports are regarded as extraordinary is service and access network dependent and may be subject for negotiation between the source and the destinations and/or between the access networks and the destinations. For example an extraordinary RTCP report can be generated when a loss rate excesses a certain threshold. The RTCP reports are then used as additional input to form an aggregated RTCP message.

Another option of the invention is to refrain from sending RTCP reports to all multicast receivers in order to maintain anonymity between the users. Typically, users are also not interested in who is receiving the information as well. Additionally this option reduces the downlink load in the network. Thus, RTCP reports except the Sender Reports are not sent in downlink direction. This option is not depicted in FIG. 4 since there is only one client shown.

In the following according to FIG. 5 an alternative for the determination of distribution characteristics associated with the clients is described.

The FIG. 5 depicts an alternative, logical architecture with clients communicating with the RNC. Further the communication path goes via Radio and Core network to the so-called Service nodes in which the aggregated feedback message is generated considering the network feedback received from the RNC. It means the functionality of getting the necessary quality information at cell level that is physically split from the node, which is compiling and sending the RTCP reports. No RTCP receiver reports are sent from the mobile client. The service node can be either a special node or a function implemented for example in GGSN or Multimedia Resource Function MRF wherein said service node outside the mobile core generates the RTCP receiver reports. RTCP receiver reports can be send per-RNC or per-cell.

Furthermore the provision of the per-cell or per-RNC RTCP reports also increases the periodicity of quality feedback information and allows the sender to adapt faster to changing conditions. The RTCP reporting interval can depend on the number of participants in the session.

In the following different detailed solutions for different scenarios are described in more details.

One of the possible scenarios is the broadcast scenario, which is characterized by a radio access set-up where no up-link is present. This means that the multicast datagrams are sent in downlink direction, but no client response is sent back. The lack of a return channel prohibits that RTCP feedback is sent back from the clients. Although RTCP messages might be generated, there exist no medium to deliver these.

For the broadcast scenario the idea is that RTCP messages are generated in a network node, for example in the RNC for WCDMA, which is basically the logical location for generating the RTCP reports. The new RTCP receiver report is created based on radio related information. Therefore, the function of creating and sending an RTCP receiver report and the data collection function can be split.

For the communication purpose the RTCP defines different RTCP messages. In the following one way of generating an aggregated message utilizing the RTCP messages is described.

The RTCP defines Sender report (SR), Receiver report (RR), Source Description Items (SDES), Bye-Message (BYE), Application specific functions (APP). The messages can be bundled to form a so-called compound message. For the invention in particular the Receiver report (RR) is important, which needs to be received by the sender in order to adapt to changing bandwidth conditions. It is proposed that such receiver reports are generated in the RNC, based on the knowledge the RNC has about the link condition in one or more cells. The RNC can generate one message for each cell it is responsible for or even form a single message for all.

In the following the different fields of a RR message are described as defined in RFC 1884.

SSRC_n (source identifier) with 32 bits is the SSRC identifier of the source, to which the information in this reception report block pertains.

The field fraction lost with 8 bits describes the fraction of RTP data packets from source SSRC_n lost since the previous SR or RR packet was sent, expressed as a fixed point number.

The field cumulative number of packets lost with 24 bits is the total number of RTP data packets from source SSRC_n that have been lost since the beginning of reception.

For the field extended highest sequence number received 32 bits are reserved. The low 16 bits contain the highest sequence number received in an RTP data packet from source SSRC_n, and the most significant 16 bits extend that sequence number with the corresponding count of sequence number cycles.

There is also the interarrival jitter field with 32 bits. An estimate of the statistical variance of the RTP data packet interarrival time, measured in timestamp units and expressed as an unsigned integer. The interarrival jitter is defined to be the mean deviation (smoothed absolute value) of the difference in packet spacing at the receiver compared to the sender for a pair of packets.

The field the last SR timestamp (LSR) with 32 bits describes the most recent RTCP sender report (SR) packet from source SSRC_n. If no SR has been received yet, the field is set to zero.

The delay since last SR (DLSR) with 32 bits is a delay, expressed in units of 1/65536 seconds, between receiving the last SR packet from source SSRC_n and sending this reception report block. If no SR packet has been received yet from SSRC_n, the DLSR field is set to zero.

The values for the entries in the RR need to be set for the purpose of the present invention to generate an aggregated feedback message.

The first field is simply the sender ID, which is known. For the second field, the fraction of lost packets, there are different alternatives. An appropriate value could be either the loss fraction seen by the RNC, or an estimate by the RNC depending on the current cell situation like for example radio resource usage, interference, etc, and depending on the reliability level chosen for the transmission in the cell.

Third field, the cumulative number of packet losses needs to be chosen according to the concept used for the previous field to avoid a mismatch. For example, if the loss fraction is based on the packet losses seen by the RNC, they should be used for this entry as well. The highest sequence number received should be the highest one the RNC has seen. The interarrival jitter could be based on the jitter either observed by the RNC, or by an estimated value taking the link parameters into account for example whether ARQ or repetition coding or FEC are used to ensure a certain degree of reliability. The last SR timestamp can be taken without modification from the sender report received from the sender. In case the sender report has not been received yet, the field is set to zero. The last field DLSR can remain either unmodified or a further improvement can be introduced. For example in order to provide better round trip time RTT estimation for the sender, it is proposed to reduce the delay value by one radio access RTT. Further in order to adapt the delay value to compensate for the access network delays, the delay value can be reduced for example by two RTT. Even though these are merely examples, which should not restrict the scope of the invention.

In the following a next scenario is presented, the multicast scenario.

The multicast scenario differs from the broadcast scenario mainly in that a return channel is available. This as such would make end-to-end RTCP signaling possible, but because of problems indicated, namely the overload of the radio resources when every client sends a report, it is proposed to generate the RTCP messages in the intermediate network part, preferably the RNC for WCDMA. In the following two currently possible embodiments are described.

In the first embodiment in the client generated RTCP messages are discarded in the client's terminal and generated from scratch in the intermediate node, like RNC. According to the RTP specification it is currently possible that the source indicates to the clients, that no RTCP receiver reporting shall be used. By receipt of this information the feedback messages in the clients are discarded or even not generated.

In the second embodiment it is foreseen that the generated RTCP messages in the clients are transmitted over the radio interface to the intermediate network part, but modified in said network part according to certain principles described below. The RTCP message interval for RTCP messages from the client can be larger than the RTCP message interval for RTCP messages from the intermediate node to the sender. The client may even send RTCP messages only event driven, for example when certain values are out of range.

The input for setting the different fields of the RR messages is the same as for the broadcast scenario. Even though for the multicast the following principles can be followed when setting the fields in the RR messages. The first principle that could be applied is when using a common transport channel in WCDMA, there will always be some receivers with poor channel conditions suffering from large packet loss, while others get good quality. The RNC could in this case shield the poor receiver reports to maintain quality for the good users.

The second principle can be applied if RNC detects an overload in a cell and wants to reduce the bit rate on the common channel used for multicast/broadcast service, it can use the RTCP reports to signal this to the Multicast server. This can be either by increasing the measured packet loss ratio in the reports, or just reducing the highest sequence number received. This will be quicker than end-to-end signaling because of the radio interface latency and since per user RTCP reporting becomes rare for large user groups.

In the following a general mechanisms are described which are common for the above-described scenarios.

As already mentioned the aggregated RTCP feedback messages are generated in an intermediate network part. In the above description the RTCP report generation is done in the RNC. In general, this report generation and all related functionality is a logical function that could also reside in other network entities, such as the multicast/broadcast server, the MB-SC. Dedicated protocols could be used to forward the relevant information from the RNC to the MB-SC in that case.

In a preferred embodiment of the present invention the user anonymity is to be guaranteed. Different from some Multicast applications in the fixed Internet like audio and video-conferences, mobile users form typically an anonymous community. Users in mobile networks which look at the same video clip are most likely not interested in knowing the names of other viewers and might also not be interested in revealing their identity. The RTCP messages, in particular the RR and SDES messages according to the standard should include the identity of users for example in the format of an email-address. Thus, the invention proposes to transmit the RTCP messages, which are generated in the intermediate node, only back to the RTP stream sender.

Together with the generation of an aggregated RTCP report, the number of destinations for which the RTCP report applies is added to the report. This information is then potentially considered by the source in case of multicast stream adaptations. It means if an aggregated RTCP report covers thousands of destinations, the source could adapt for these destinations. If it covers only ten destinations in a session where thousands of destinations are involved, it may be better to advise the clients to switch to a unicast session instead.

In the following two embodiments of the present invention are disclosed. In the first one an aggregated feedback message is generated in the intermediate node based on the RTCP reports per mobile terminal as disclosed according to FIG. 6.

FIG. 6 depicts a multicast source sending RTP flow, downstream-multicast traffic via an intermediate node and the corresponding RNCs to the clients with their mobile terminals. The intermediate node generates RTCP receiver reports and sends these as feedback to the multicast source. Said feedback is generated considering the user and cell information received from the RNC.

To distinguish between several multicast sources, each receiver report (RR) packet is addressed by the SSRC of the source. Therefore, the intermediate node must process and forward the downstream-multicast traffic from the source to the receivers and extract the SSRC of the Multicast Source. The SSRC is necessary to address the upstream RTCP receiver report packets, which are generated in the intermediate node. The number of mobile terminals per cell plus reception conditions per terminal is provided by the RNC.

The intermediate node must allocate an SSRC identifier for each client's terminal. The intermediate node must allocate the SSRC on behalf of each client's terminal. Beside the SSRC, the intermediate node must also provide a SDES CNAME item for each client. There are several options of choosing the CNAME for a particular user. In case of anonymous participation, when the source shall not get a clear CNAME, the SDES CNAME item is randomly chosen. It can be for example in form of <random-number>@host. The CNAME must be unique. In case of a non-anonymous CNAME, either the operator predetermines the user name for example phonenumber@domain or the user specifies the CNAME in a preference database. Therefore, the intermediate node must maintain a list of client's terminals per cell plus the associated SSRCs allocated by the intermediate node and CNAMEs. The intermediate node functionality is possibly included in the BM-SC or the GGSN. The content of each RTCP packet is created like described in the previous chapters.

In case the very large user group, which is spread over a very large number of cells, the Intermediate node shall send RTCP packets not per client but per cell. It is very likely, that each cell servers an approximately equal number of group members. This embodiment is disclosed in FIG. 7, which depicts coincident facts as in FIG. 6. The difference is that the intermediate node generates a feedback message per cell.

In this case, the Intermediate node allocates valid SSRCs and CNAME for each cell, which contains group members. The number of send RTCP packets is decreased. The transmission interval of RTCP packets and therefore also the reaction time of the multicast source decreases by sending per-cell RTCP packets.

As an additional RTCP packet type can be introduced into to weight the RTCP receiver report to the number of users in the cell. This RTCP packet type must part of a RTCP compound packet whenever this RTCP packets contains receiver reports for more than one member.

The present invention delivers a solution for wireless and multicast specific RTCP reporting taking the specifics of wireless networks into account and improving the overall service quality. Other information from lower layer protocols as already known in the RNC, can be considered in the reports to further optimize the service quality. However, it is just one part of the invention to forward additional radio related info to the source. Another one is that the RNC considers the info and makes an adaptation proposal to the source. With this the source does not need to have info about the radio network, since it is the radio network that converts this info to a known adaptation proposal for the source.

The invention claimed is:

1. A method b adapting multi-user multimedia data in a communication network, with a server providing the multi-user multimedia data to a group of clients, comprising the steps of:
   providing information on distribution characteristics to an Intermediate network part between the server and the group of clients, wherein the intermediate network part is a functionality implemented in one or more nodes;
   sending a data stream, via the intermediate network part containing the multi-user multimedia data from the server to the group of clients;
   determining real time distribution characteristics, regarding the data stream, associated with the group of clients;
   generating a feedback report on the group of clients' reception conditions of the data stream, considering the distribution characteristics, said feedback report comprising a client group structure and an aggregation of the real time distribution characteristics of all clients in the group including Information about aggregation technique and manner of adaptation;
   Suppressing a portion of the feedback report in the network terminals;
   sending the feedback report to the server; and adapting transmission of the data stream from the server to the group of clients according to the feedback report.

2. The method according to claim 1, wherein the distribution characteristics are related to a geographical area including a group of clients.

3. The method according to claim 2 wherein the geographical area is covered by one or more cells in a wireless communication network.

4. The method according to claim 1 wherein the distribution characteristics are related to a determined multicast group structure.

5. The method according to claim 1 wherein the distribution characteristics are related to information received from a radio resource management.

6. The method according to claim 5 wherein the information received from the radio resource management is sent either frequently or event-based.

7. The method according to claim 1 wherein the distribution characteristics are related to information received from the group of clients.

8. The method according to claim 7 wherein the information received from the group of clients is sent either frequently or event-based.

9. The method according to claim 1 wherein the suppressed portion of the feedback report comprises RTCP feedback.

10. The method according to claim 1 wherein the information received from the group of clients impacts information from the radio resource management.

11. The method according to claim 1 wherein the information about aggregation technique includes a number of clients to which the feedback report applies.

12. The method according to claim 1 wherein the additional information about aggregation technique comprises radio characteristics of an access network in which the clients are.

13. The method according to claim 6 wherein a negotiation on the frequency of feedback reports from the clients or from the radio resource management to the intermediate node is performed.

14. The method according to claim 1 wherein the terminals refrain from sending feedback reports to other terminals receiving the data stream.

15. The method according to claim 1 wherein the generated feedback report includes a fraction of lost packets provided by the intermediate node depending on the current conditions of delivery, a highest sequence number the intermediate node has received, and an inter-arrival jitter provided by the intermediate node.

16. The method according to claim 1 wherein by receiving the feedback report the source utilizes the information included in the report considering the percentage of the clients for which said feedback applies wherein the stream is adapted to reduce bit rate or switch to a more reliable codec.

17. The method according to claim 1 wherein the generation of the feedback report and the determining of distribution characteristics associated with the clients are performed in a same node being the intermediate network part or are split between different nodes forming the intermediate network part.

18. The method according to claim 1 wherein the transmission of data stream is performed by means of RTP having a control protocol RTCP for reporting feedback.

19. An intermediate network part for adapting a multi-user data stream in a communication network with a server providing the multi-user data stream to a group of clients, the intermediate network part being Implemented in one or more nodes and arranged to provide information on distribution characteristics between the sewer and the group of clients and wherein said intermediate network part comprises:
   means for forwarding the data stream from the server to the group of clients;
   means for determining of the distribution characteristics associated with the group of clients;
   means for generating a feedback report on the group of clients'reception conditions of the data stream considering the distribution characteristics, said feedback report including a client group structure and an aggregation of the real time distribution characteristics of all clients in the group including information about aggregation technique, and manner pf adaptation;
   means for suppressing a portion, comprising RTCP feedback, of the feedback report in the network terminals; and
   means for sending the aggregated feedback report to the server.

20. The intermediate network part according to claim 19 having all the means implemented in a same network node.

21. The intermediate network part according to claim 19, wherein the means for determining distribution characteristics associated with the group of clients and the means for generating an aggregated feedback report are each incorporated in different nodes.

22. The intermediate network part according to claim 21 having means for receiving the external determined distribution characteristics associated with the group of clients.

* * * * *

UNITED STATES PATENT AND TRADEMARK OFFICE
CERTIFICATE OF CORRECTION

| | |
|---|---|
| PATENT NO. | : 7,734,762 B2 |
| APPLICATION NO. | : 10/533228 |
| DATED | : June 8, 2010 |
| INVENTOR(S) | : Hundscheidt et al. |

It is certified that error appears in the above-identified patent and that said Letters Patent is hereby corrected as shown below:

In Column 1, Line 4, delete "TECHNICAL FILED OF THE INVENTION".

In Column 6, Line 55, delete "Broadcast/" and insert -- Multimedia Broadcast/ --, therefor.

In Column 12, Line 45, in Claim 1, delete "b" and insert -- for --, therefor.

In Column 12, Line 50, in Claim 1, delete "Intermediate" and insert -- intermediate --, therefor.

In Column 12, Line 63, in Claim 1, delete "Information" and insert -- information --, therefor.

In Column 12, Line 65, in Claim 1, delete "Suppressing" and insert -- suppressing -- , therefor.

In Column 14, Line 18, in Claim 19, delete "Implemented" and insert -- implemented --, therefor.

In Column 14, Line 20, in Claim 19, delete "sewer" and insert -- server --, therefor.

In Column 14, Line 32, in Claim 19, delete "pf" and insert -- of --, therefor.

Signed and Sealed this
Twenty-second Day of March, 2011

David J. Kappos
*Director of the United States Patent and Trademark Office*